United States Patent
Hsu

(12) 
(10) Patent No.: US 6,574,962 B1
(45) Date of Patent: Jun. 10, 2003

(54) KOH FLUE GAS RECIRCULATION POWER PLANT WITH WASTE HEAT AND BYPRODUCT RECOVERY

(76) Inventor: Justin Chin-Chung Hsu, 2406 Ravenview Rd., Timonium, MD (US) 21093

( * ) Notice: Subject to any disclaimer, the term of this patent is extended or adjusted under 35 U.S.C. 154(b) by 0 days.

(21) Appl. No.: 09/990,360

(22) Filed: Nov. 23, 2001

(51) Int. Cl.[7] .............................................. F01K 25/06
(52) U.S. Cl. .............................. 60/649; 60/651; 60/671
(58) Field of Search ........................ 60/649, 651, 671, 60/39.5

(56) References Cited

U.S. PATENT DOCUMENTS

| | | | | |
|---|---|---|---|---|
| 4,542,114 A | * | 9/1985 | Hegarty | 502/39 |
| 5,403,569 A | * | 4/1995 | Abdelmalek | 423/242.7 |
| 5,467,722 A | * | 11/1995 | Meratla | 110/345 |
| 5,906,806 A | * | 5/1999 | Clark | 423/437.1 |
| 6,196,000 B1 | * | 3/2001 | Fassbender | 60/649 |

* cited by examiner

Primary Examiner—Hoang Nguyen

(57) ABSTRACT

The invention relates to an integrated power plant, which burns fuel using an oxygen-enriched stream in a combustion furnace and converts emissions of air pollutants and carbon dioxide into byproducts. The combustion flue gas stream, after leaving an economizer of a steam generation system, splits into stream A and stream B. Stream A recirculates back to the combustion furnace through the first flue gas recirculation fan for combustion temperature control. Stream B, after passing through a dust collector for fly ash removal, a series of condensers for byproduct recovery, and the second flue gas recirculation fan, mixes with an oxygen-enriched stream from an air separation unit and flows back to the combustion furnace. The plant does not need an exhaust stack and does not discharge combustion flue gases into the atmosphere.

11 Claims, 3 Drawing Sheets

| Coal Component | Pounds per Pound of Coal | Combustion Product | Pounds per Pound of Coal | Boiling Point at 1 atm, degree.F | Melting Point at 1 atm, degree.F | Heat of Vaporization, Btu/lb |
|---|---|---|---|---|---|---|
| Moisture | 0.025 | Water | 0.025 | 212 | 32 | 972.9 |
| Carbon | 0.75 | Carbon Dioxide | 2.75 | -109.3 (sublimation) | -71.5 at 5.2 atm | 246.68 (sublimation) |
| Hydrogen | 0.05 | Water | 0.45 | 212 | 32 | 972.9 |
| Sulfur | 0.023 | Sulfur Dioxide | 0.046 | 14 | -98.86 | 167.6 |
| Nitrogen | 0.015 | Nitrogen Dioxide | 0.0493 | 70.16 | 11.84 | 134.74 |
| Oxygen | 0.067 | Oxygen | Insignificant | -297.33 | -362.12 | 91.63 |
| Ash | 0.07 | | | | | |
| Heating value, Btu/lb | 13,000 | | | | | |
| | | Nitric Oxide | Insignificant | -241.24 | -262.48 | 198.42 |
| | | Carbon Monoxide | Insignificant | -326.2 | -344.7.0 | 92.83 |
| | | Ammonia | Insignificant | -28.0 | -107.9 | 590.93 |
| | | Methane | Insignificant | -263.20 | -295.6 | 219.36 |
| | | Nitrogen | Insignificant | -320.44 | -345.75 | 85.89 |

FIG. 2

KOH FLUE GAS RECIRCULATION POWER PLANT WITH WASTE HEAT AND BYPRODUCT RECOVERY

CROSS-REFERENCE TO RELATED APPLICATION

| U.S. Patent Documents | | | |
|---|---|---|---|
| 5,906,806 | May, 1999 | Clark | 60/649 |
| 5,937,652 | Aug., 1999 | Abdelmalek | 60/648 |
| 6,047,547 | Apr., 2000 | Heaf | 60/618 |
| 6,116,169 | Sep., 2000 | Miyoshi, et al | 110/216 |
| 6,196,000 | Mar., 2001 | Fassbender | 60/649 |
| 6,282,901 | Sep., 2001 | Marin, et al. | 60/649 |

BACKGROUND OF THE INVENTION

1. Field of the Invention

KOH is the last name of the inventor, and this invention is called KOH flue gas recirculation power plant with waste heat and byproduct recovery.

The invention relates to a process for power generation, which is both environmentally sound and cost-effective. More specifically, the invention relates to a process of burning any combustible material for efficient power generation, elimination of air pollutants and carbon dioxide emissions, and recovery of liquid nitrogen dioxide, liquid sulfur dioxide, and liquid carbon dioxide.

2. Description of the Prior Art

A conventional power plant consisting of a combustion furnace, a steam boiler, steam turbines, and a dust collector has been implemented for power generation and steam production for several, decades. Conventional power plants, particularly for coal-fired plants, emit a huge amount of nitrogen oxides, sulfur dioxide, carbon monoxide, particulate matters, heavy metals, and incomplete combustion products. Since air pollution control requirements become more stringent from time to time, power plants must be equipped with more sophisticated and expensive pollution control systems to meet regulatory emission limits. For sulfur oxides emission control, a flue gas desulfurization system or a fluidized bed combustion furnace is widely used. For nitrogen oxides emission control, power plants have implemented a combustion flue gas recirculation for staged combustion with steam or water injection, low NOx burners, selective catalytic reduction systems, non-selective catalytic systems, or any combination thereof to meet the emission limits.

Since the 1980's, the integrated gasification combined cycle (IGCC) concept has been explored extensively. IGCC uses an oxygen stream for coal gasification and produces a gaseous stream consisting of methane, hydrogen sulfide, carbon monoxide, ammonia, etc. The gaseous stream passes through a sulfur removal system such as a Claus plant before burning in a gas turbine. In addition to requiring an expensive sulfur removal system, an IGCC plant must implement a nitrogen oxides removal system in order to meet regulatory requirements.

Since the Kyoto Accord for reduction of carbon dioxide, which is a greenhouse gas that causes global warming and associated climatic changes, coal-fired power plants have been extensively scrutinized. Although a coal-fired power plant is still the most cost-effective in power generation, its carbon dioxide emission is more than two times that of a natural gas fired plant. An MEA scrubbing system using monoethanolamine as absorbing agent has been implemented to recover carbon dioxide from combustion flue gases, but it is still not cost-effective. To enhance carbon dioxide recovery, oxygen is increasingly proposed as a replacement of air in fuel burning to reduce the volume of combustion flue gases and to increase the concentration of carbon dioxide in combustion flue gases.

U.S. Pat. No. 5,906,806 issued to Clark proposes to burn fuel using oxygen, water, and a recirculated combustion stream from a baghouse in two combustion furnaces. For additional air pollution control, Clark's proposal requires several expensive control systems, which include an electron beam reactor, an ozone oxidation chamber, and an electrostatic precipitator with catalytic reactor. In addition, the combustion product discharged to the atmosphere still contains some incomplete combustion products and nitrogen oxides and excess oxygen discharged with combustion flue gases reduces utilization of oxygen generated by an air separation unit.

U.S. Pat. 6,196,000 issued to Fassbender proposes to burn fuel using oxygen and liquid carbon dioxide recovered from combustion process. For enhancing thermodynamic efficiency and carbon dioxide recovery, Fassbender proposes to operate an elevated pressure power plant. All operating units including a reaction chamber, a combustion chamber, a catalyst chamber, a hydrocone, heat exchanges, and condensers are under extremely high pressure, ranging from 300 to 5000 psia. A pressurized vessel requires additional power to operate and become a safety concern. In addition, the pressurized power plant still vents to the atmosphere a combustion flue gas stream containing some air pollutants and oxygen.

BRIEF SUMMARY OF THE INVENTION

The invention is an integrated combustion process for efficient power generation, recovery of waste heat and byproduct, and elimination of air pollution. A combustion furnace, air separation units, a steam boiler with an economizer, a dust and acid gas removal system, several condensers, and absorption refrigeration units are integrated with two combustion flue gas recirculation loops to enhance steam production and to prevent combustion flue gases from being discharged into the atmosphere.

When oxygen is used instead of air for fuel combustion, the temperature of combustion products is extremely high. For combustion temperature control, the first combustion flue gas recirculation loop is implemented to recirculate part of the combustion gas stream from the economizer to the combustion furnace. How much of the combustion flue gas stream from the economizer to be recirculated back to the combustion furnace greatly depends on the chemical composition and heat content of fuel.

The combustion flue gas stream from the economizer, which is not recirculated back to the combustion furnace, passes through an oxygen-enriched stream heater for additional waste heat recovery, a fly ash and acid gas removal system, and several byproduct condensation units. After leaving the carbon dioxide condenser, it mixes with an oxygen-enriched stream from the air separation unit and flows back to the combustion furnace. The purpose of the second combustion flue gas recirculation loop is to eliminate any incomplete combustion products in the combustion furnace and reuse oxygen present in the combustion flue gas stream. Therefore, a combustion process designed according to the invention does not discharge combustion flue gases and air pollutants to the atmosphere. The nitrogen-enriched stream from the air separation unit is used in the condensers for byproduct recovery.

Absorption refrigeration units are integrated with the process to recover and convert waste steam from steam turbines to cooling. Cooling generated by absorption refrigeration units is used for enhancing condensing processes as well as providing extra cooling for industrial, commercial, or residential uses.

BRIEF DESCRIPTION OF THE DRAWINGS

The integrated nature of the present invention's steps is better understood by reviewing the detailed description of the invention in conjunction with the accompanying drawings, in which:

FIG. 2 is a table listing coal chemical composition, combustion products, boiling and melting temperatures, and heat of vaporization.

DETAILED DESCRIPTION OF THE INVENTION

Figure 1:
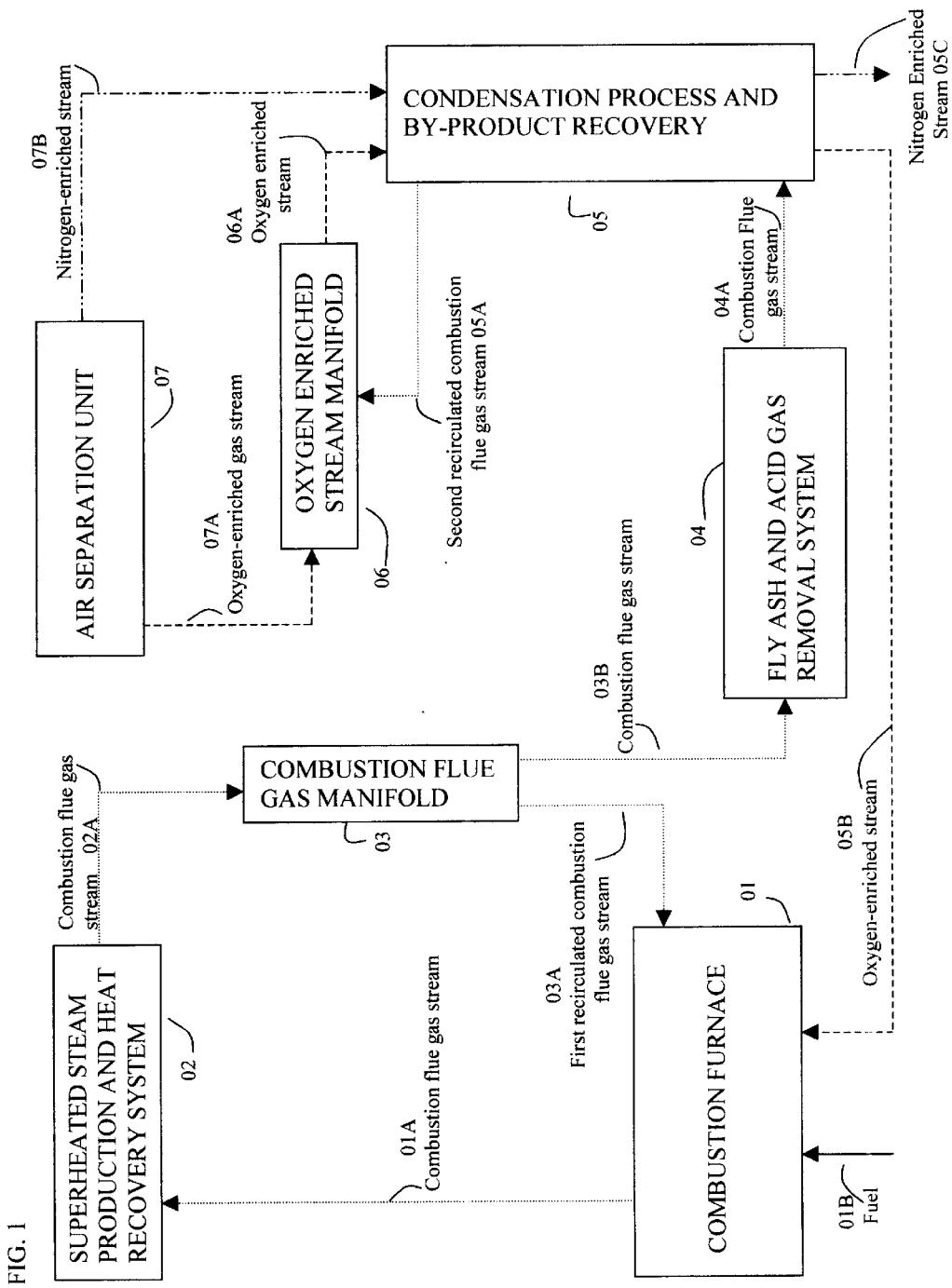
FIG. 1 is a block flow diagram of the present invention showing relationship between each combustion flue gas stream, oxygen-enriched stream, and nitrogen-enriched stream.
Figure 3:
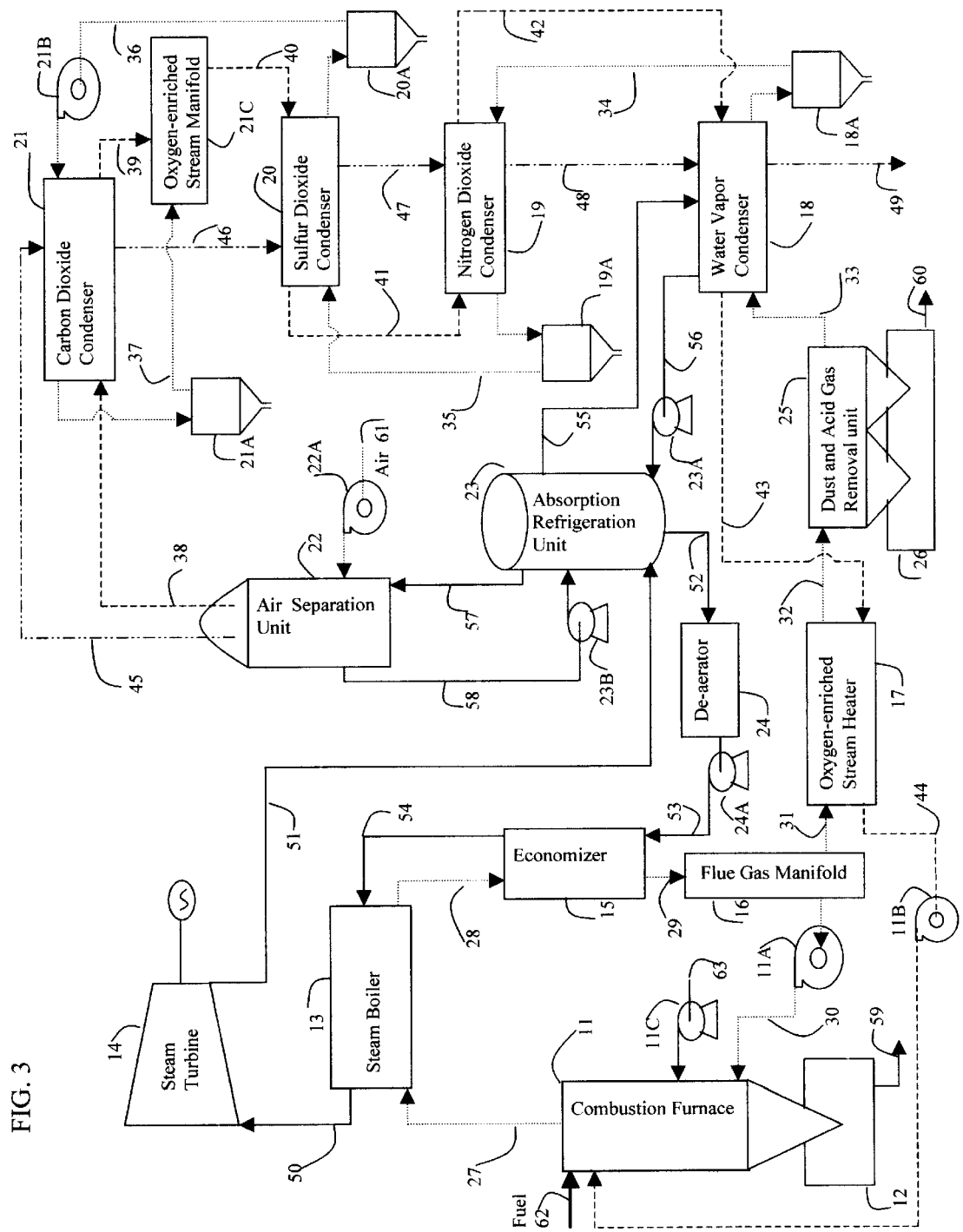
FIG. 3 is a schematic representation of an integrated power plant incorporating the present invention to achieve no discharge of combustion flue gas and air pollutants.

FIG. 1 shows the objects of the present invention that is a process consisting of two flue gas recirculation loops to prevent the discharge of combustion flue gas from a power plant. The first flue gas recirculation loop comprises combustion flue gas stream 01A, combustion flue gas stream 02A, and first recirculated combustion flue gas stream 03A. The second flue gas recirculation loop comprises combustion flue gas stream 01A, combustion flue gas stream 02A, combustion flue gas stream 03B, combustion flue gas stream 04A, second recirculated combustion flue gas stream 05A, oxygen-enriched stream 06A, and oxygen-enriched stream 05B. FIG. 3 graphically depicts the relationship among various unit operations and various streams.

The heat content with chemical composition of fuel determines theoretical oxygen requirement. One pound of coal with heat content and chemical composition shown in FIG. 2 needs about 2.4 pounds of oxygen compared to 4.0 pounds of oxygen needed for one pound of methane. During a startup mode, when fuel stream 62 burns with oxygen-enriched stream 44 in combustion furnace 11, liquid carbon dioxide stream or water stream 63 is injected into combustion furnace 11, through feed pump 11C, for combustion temperature control until the process reaches a normal mode of operation.

To maintain the combustion temperature between 2000 and 2500.degree.F. inside a refractory-wall combustion furnace, one pound of coal, with heat content and chemical composition shown in FIG. 2, requires between 8 and 12 pounds of liquid carbon dioxide or between 4 and 5 pounds of water. For one pound of methane, it needs between 18 and 24 pounds of liquid carbon dioxide or between 7.5 and 9.5 pounds of water. For a water-wall combustion furnace, it needs a less amount of liquid carbon dioxide or water for combustion temperature control because water flowing through water-wall tubes reduces combustion temperature. Combustion furnace 11 is a combustion device commonly known by those of ordinary skill in the art. Bottom ash from combustion chamber 11 drops into bottom ash collection tank 12, which is equipped with water seals to prevent air from entering combustion chamber 11. Sludge steam 59 is drawn from bottom ash collection tank 12 to an ash management and disposal system Combustion flue gas stream 27 with a temperature between 2000 and 2500.degree.F. from combustion furnace 11 enters steam boiler 13 to convert water/steam stream 54 from economizer 15 to superheated steam 50 used in steam turbine 14 for electricity generation. Combustion flue gas stream 28 with a temperature between 800 and 1000.degree.F from steam boiler 13 enters economizer 15 to preheat water/steam stream 53 from de-aerator 24, through pump 24A. Combustion flue gas stream 29, with a temperature between 600 and 800.degree.F from economizer 15 enters flue gas manifold 16, where it splits into combustion flue gas stream 30 and combustion flue gas stream 31. Steam boiler 13 and economizer 15 are indirect heat exchanges commonly known by those of ordinary skill in the art.

Combustion flue gas stream 30 is recirculated back to combustion furnace 11, through flue gas recirculation pump 11A, for combustion temperature control. Combustion flue gas stream 31 enters oxygen-enriched stream heater 17. The ratio of combustion flue gas stream 30 to combustion flue gas stream 31 depends on fuel involved in combustion. When the process reaches its normal mode of operation, the ratio for coal discussed in FIG. 2 is between 4 and 7 compared to a ratio between 5 and 8.5 for methane. The ratio of combustion flue gas stream 30 to combustion flue gas stream 31 is significantly lower for a water-wall combustion furnace.

In a normal operation mode, the volume of combustion flue gas stream 31 is less than 30 percent of that generated by a conventional power plant using air stream for combustion. Oxygen-enriched stream heater 17 is an indirect heat exchanger, which is commonly known by those of ordinary skill in the art. Inside oxygen-enriched stream heater 17, combustion flue gas stream 31 preheats oxygen-enriched stream 43 from water vapor condenser 18.

Combustion flue gas stream 32 with a temperature between 250 and 450.degree.F enters dust and acid gas removal unit 25 for fly ash and acid gas removal. Dust and acid gas removal unit 25 is a baghouse, a dry or wet cyclone, a dry or wet multiple-cyclone collector, a venturi scrubber, a packed bed absorber, an electrostatic precipitator, or any combination of thereof, which is commonly known by those of ordinary skill in the art. Dust and acid gas removal unit 25 is equipped with water seals to prevent air from entering combustion flue gas streams. For fuel containing chloride and other halogen, a multiple-cyclone collector with a packed bed absorber is preferably selected to remove fly ash, hydrogen chloride, sulfuric acid, and other hydrogen halides. If a baghouse is preferably implemented, carbon dioxide is used instead of air for bag cleaning to prevent air from entering combustion flue gas streams 32 and 33. Fly ash and other acidic material collected by dust and acid gas removal unit 25 drop into fly ash collection tank 26 and sludge stream 60 is discharged to an ash management and disposal system.

Combustion flue gas stream 33 from dust and acid gas removal unit 25 enters water vapor condenser 18 for removal of water vapor, remaining fly ash, and any condensable material found in combustion flue gas stream 33. Water vapor condenser 21 is an indirect heat exchanger, which is commonly known by those of ordinary skill in the art. Water collected from water vapor condenser 18 is preferably used for fly ash and bottom ash collection tanks. Inside water vapor condenser 18, oxygen-enriched stream 42 from nitrogen dioxide condenser 19 serves as a main cooling stream. Nitrogen-enriched stream 48 from nitrogen dioxide condenser 19 as well as coolant stream 55 from absorption refrigeration unit 23 is arranged in the process to provide sufficient cooling for water vapor condenser 18.

Combustion flue gas stream 34 with a temperature between 90 and 180.degree.F. from water collection tank 18A, which is connected to water vapor condenser 18, enters nitrogen dioxide condenser 19 for removal of nitrogen dioxide and any condensable material found in combustion flue gas stream 34. Nitrogen dioxide condenser 21 is an indirect heat exchanger, which is commonly known by those of ordinary skill in the art. Inside nitrogen dioxide condenser 19, oxygen-enriched stream 41 from sulfur dioxide condenser 20 serves as a main cooling stream. Nitrogen-enriched stream 47 from sulfur dioxide condenser 20 is arranged to provide sufficient cooling for nitrogen dioxide condenser 19. Liquid nitrogen dioxide is a process byproduct, which could be used for production of nitric acid, nitrating or oxidizing agent, catalyst, rocket fuels, or polymerization inhibitor for acrylates.

Combustion flue gas stream 35 with a temperature between 20 and 60.degree.F. from liquid nitrogen dioxide collection tank 19A, which is connected to nitrogen dioxide condenser 19, enters sulfur dioxide condenser 20 for removal of sulfur dioxide and any condensable material found in combustion flue gas stream 35. Sulfur dioxide condenser 20 is an indirect heat exchanger, which is commonly known by those of ordinary skill in the art. Inside sulfur dioxide condenser 20, oxygen-enriched stream 40 from oxygen-enriched stream manifold 21C serves as a main cooling stream. Nitrogen-enriched stream 46 from carbon dioxide condenser 21 is arranged to provide sufficient cooling for sulfur dioxide condenser 20. Liquid sulfur dioxide is a process byproduct, which could be used for production of sulfuric acid, sulfite paper pulp, sulfonation of oil, antioxidant, reducing agent, and many other uses.

After leaving liquid sulfur dioxide collection tank 20A, which is connected to sulfur dioxide condenser 20, combustion flue gas stream 36 with a temperature between −60 and 10.degree.F. is pressurized by flue gas recirculation fan 21B to a pressure above 77 psia and enters carbon dioxide condenser 21 for removal of carbon dioxide and any condensable material found in combustion flue gas stream 36. Carbon dioxide condenser 21 is an indirect heat exchanger, which is commonly known by those of ordinary skill in the art. Inside carbon dioxide condenser 21, both oxygen-enriched stream 38 and nitrogen-enriched stream 45 from air separation unit 22 serve as cooling streams. Liquid carbon dioxide is a major process byproduct, which could be used for refrigeration, carbonated beverages, aerosol propellant, fire extinguishing, fracturing and acidizing of oil wells, and many other uses.

After liquid carbon dioxide being removed, combustion flue gas stream 37 from liquid carbon dioxide collection tank 21A, which is connected to carbon dioxide condenser 21, is a small stream containing a small amount of carbon dioxide, carbon monoxide, nitric oxide, methane, ammonia, and oxygen. It enters oxygen-enriched stream manifold 21C and combines with oxygen-enriched stream 39 from carbon dioxide condenser 21. The purpose of this (second) combustion flue gas recirculation loop is to eliminate the discharge of combustion flue gases and air pollution into the atmosphere and fully utilize oxygen produced by air separation unit 22. The combined stream, oxygen-enriched stream 40, passes through sulfur dioxide condenser 20, nitrogen dioxide condenser 19, water vapor condenser 18, and oxygen-enriched stream heater 17. Then, it enters combustion furnace through forced draft fan 11B to begin another combustion cycle.

Preferably, this invention incorporates absorption refrigeration unit 23, which is commonly known by those of ordinary skill in the art, to recover waste steam stream 51 from steam turbine 14 for cooling, which is used for water vapor condenser 18, air separation unit 22, and other industrial, commercial, or residential use. For reducing energy consumption by air separation unit 22 in air separation process, coolant streams 57 and 58 are circulated between absorption refrigeration unit 23 and air separation unit 22. To provide sufficient cooling for water vapor condenser 18, coolant streams 55 and 56 are circulated between absorption refrigeration unit 23 and water vapor condenser 18.

I claim:
1. A process, KOH flue gas recirculation power plant with waste heat and byproduct recovery, comprising:
 (a) at least an air separation unit;
 (b) a combustion furnace burning a fuel stream;
 (c) a combustion flue gas stream generated from said combustion furnace;
 (d) a superheated steam production and heat recovery system recovering heat from said combustion flue gas stream from said combustion furnace;
 (e) a combustion flue gas manifold splitting said combustion flue gas stream from said superheated steam production and heat recovery system into a combustion flue gas stream A and a combustion flue gas stream B, wherein said combustion flue gas stream A flowing from said combustion flue gas manifold to said combustion furnace for combustion temperature control;
 (f) a fly ash and acid gas removal system removing fly ash and acidic material found in said combustion flue gas stream B from said combustion flue gas manifold;
 (g) a condensation process and byproduct recovery system removing any condensable material found in said combustion flue gas stream B from said fly ash and acid gas removal system;
 (h) an oxygen-enriched stream manifold combining an oxygen-enriched stream from said air separation unit and said combustion flue gas stream B from said condensation process and byproduct recovery system to form a combined oxygen-enriched stream, wherein said combined oxygen-enriched stream flowing through said condensation process and byproduct recovery system and entering said combustion furnace for combusting said fuel stream and said combustion flue gas stream A;
 (i) a first flue gas recirculation loop comprising said combustion flue gas stream from said combustion furnace to said superheated steam production and heat recovery system, said combustion flue gas stream from said superheated steam production and heat recovery system to said combustion flue gas manifold, and said combustion flue gas stream A from said combustion flue gas manifold to said combustion furnace; and
 (j) a second flue gas recirculation loop comprising said combustion flue gas stream from said combustion furnace to said superheated steam production and heat recovery system, said combustion flue gas stream from said superheated steam production and heat recovery system to said combustion flue gas manifold, said combustion flue gas stream B from said combustion flue gas manifold flowing through said fly ash and acid gas removal system and said condensation process and byproduct recovery system and entering said oxygen-enriched stream manifold, and said combined oxygen-enriched stream from said oxygen-enriched stream manifold flowing through said condensation process and byproduct recovery system and entering said combustion furnace.

2. The process of claim 1, wherein said fuel stream includes coal, wood, refuse derived fuel, any fossil fuel, natural gas, and combustible waste, or any combination thereof.

3. The process of claim 1, wherein said combustion furnace is a water-wall combustion furnace, a refractory-wall combustion furnace, or any conventional combustion furnace.

4. The process of claim 1, wherein said fly ash and acid gas removal system is a wet cyclone, a wet multiple-cyclone collector, a dry cyclone, a dry multiple-cyclone collector, a packed bed absorber, a venturi scrubber, a baghouse, an electrostatic precipitator, or any combination thereof.

5. The process of claim 1, wherein said condensation process and byproduct recovery system includes a water condenser, a nitrogen dioxide condenser, a sulfur dioxide condenser, a carbon dioxide condenser, or any combination thereof.

6. A process, KOH flue gas recirculation power plant with waste heat and byproduct recovery, to treat a combustion flue gas stream from a combustion furnace without discharge into the atmosphere of combustion flue gas and air emissions comprising:

(a) a fuel loading system with a carbon dioxide blanketing system to load a fuel stream into said combustion furnace, wherein said carbon dioxide blanketing system is used to prevent air from entering said combustion furnace with said fuel stream;

(b) a bottom ash collection and management system with water seals to remove bottom ash from said combustion furnace, wherein said water seals are used to prevent air from entering said combustion furnace;

(c) a steam and electricity generation system comprising a steam boiler, at least one superheater, at least one reheater, an economizer, at least one steam turbine, and a waste steam collection and recovery unit to recover heat from said combustion flue gas stream from said combustion furnace, wherein said waste steam collection and recovery unit collects a waste steam stream discharged from said steam turbine;

(d) a combustion flue gas manifold to receive said combustion flue gas stream from said economizer and to split said combustion flue gas stream into a combustion flue gas stream A and a combustion flue gas stream B;

(e) a first flue gas recirculation fan to introduce said combustion flue gas stream A from said combustion flue gas manifold into said combustion furnace for combustion temperature control;

(f) an oxygen-enriched stream heater to recover heat from said combustion flue gas stream B from said combustion flue gas manifold;

(g) a dust and acid gas removal system with water seals for removing suspended particulate matters and acid gases, such as sulfur trioxide and hydrogen chloride, found in said combustion flue gas stream B from said oxygen-enriched stream heater, wherein said water seals are used to prevent air from entering said dust and acid gas removal system and said combustion flue gas stream B;

(h) a water vapor condenser to liquefy water vapor and any condensable materials found in said combustion flue gas stream B from said dust and acid gas removal system;

(i) a nitrogen dioxide condenser to liquefy nitrogen dioxide and any condensable materials found in said combustion flue gas stream B from said water vapor condenser;

(j) a sulfur dioxide condenser to liquefy sulfur dioxide and any condensable materials found in said combustion flue gas stream B coming from said nitrogen dioxide condenser;

(k) a second flue gas recirculation fan to compress said combustion flue gas stream B from said sulfur dioxide condenser to a pressure of 77 psia or higher;

(l) a carbon dioxide condenser to liquefy carbon dioxide and any condensable materials found in said combustion flue gas stream B from said second flue gas recirculation fan;

(m) at least one air separation unit to separate air into an oxygen-enriched stream and a nitrogen-enriched stream, wherein said oxygen-enriched stream enters said carbon dioxide condenser and said nitrogen-enriched stream flows through said carbon dioxide condenser, said sulfur dioxide condenser, said nitrogen dioxide condenser, and said water vapor condenser to provide additional cooling;

(n) an oxygen-enriched stream manifold, wherein said combustion flue gas stream B from said carbon dioxide condenser combines with said oxygen-enriched stream from said carbon dioxide condenser to form a combined oxygen-enriched stream, wherein said combined oxygen-enriched stream goes through said sulfur dioxide condenser, said nitrogen dioxide condenser, said water vapor condenser, and said oxygen-enriched stream heater before entering said combustion furnace; and (o) at least one absorption refrigeration unit to use said waste steam stream from said waste steam collection and recovery unit for cooling generation, wherein a coolant stream circulates between said air separation unit and said absorption refrigeration unit, and another coolant stream circulates between said water vapor condenser and said absorption refrigeration unit.

7. The process of claim 6, wherein a liquid carbon dioxide feed pump or a water feed pimp is used to inject liquid carbon dioxide or water into said combustion furnace for combustion temperature control during plant's start-up mode or any emergency mode.

8. The process of claim 6, wherein said combustion furnace is a water-wall combustion furnace, a refractory-wall combustion furnace, or any conventional combustion furnace.

9. The process of claim 6, wherein said fuel stream includes coal, wood, refuse derived fuel, fossil fuel, natural gas, any combustible waste, or any combination thereof.

10. The process of claim 6, wherein said dust and acid gas removal system includes a wet cyclone, a wet multiple-cyclone collector, a dry cyclone, a dry multiple-cyclone collector, a packed bed absorber, a venturi scrubber, a baghouse, an electrostatic precipitator, or any combination thereof.

11. The process of claim 6, wherein said baghouse is equipped with a carbon dioxide injection system for bag filter cleaning in order to prevent air from entering said baghouse and said combustion flue gas stream B.

* * * * *